March 24, 1959  E. MUNOZ JUSTIZ  2,879,371
ELECTRIC HEATER
Filed April 16, 1957  2 Sheets-Sheet 1
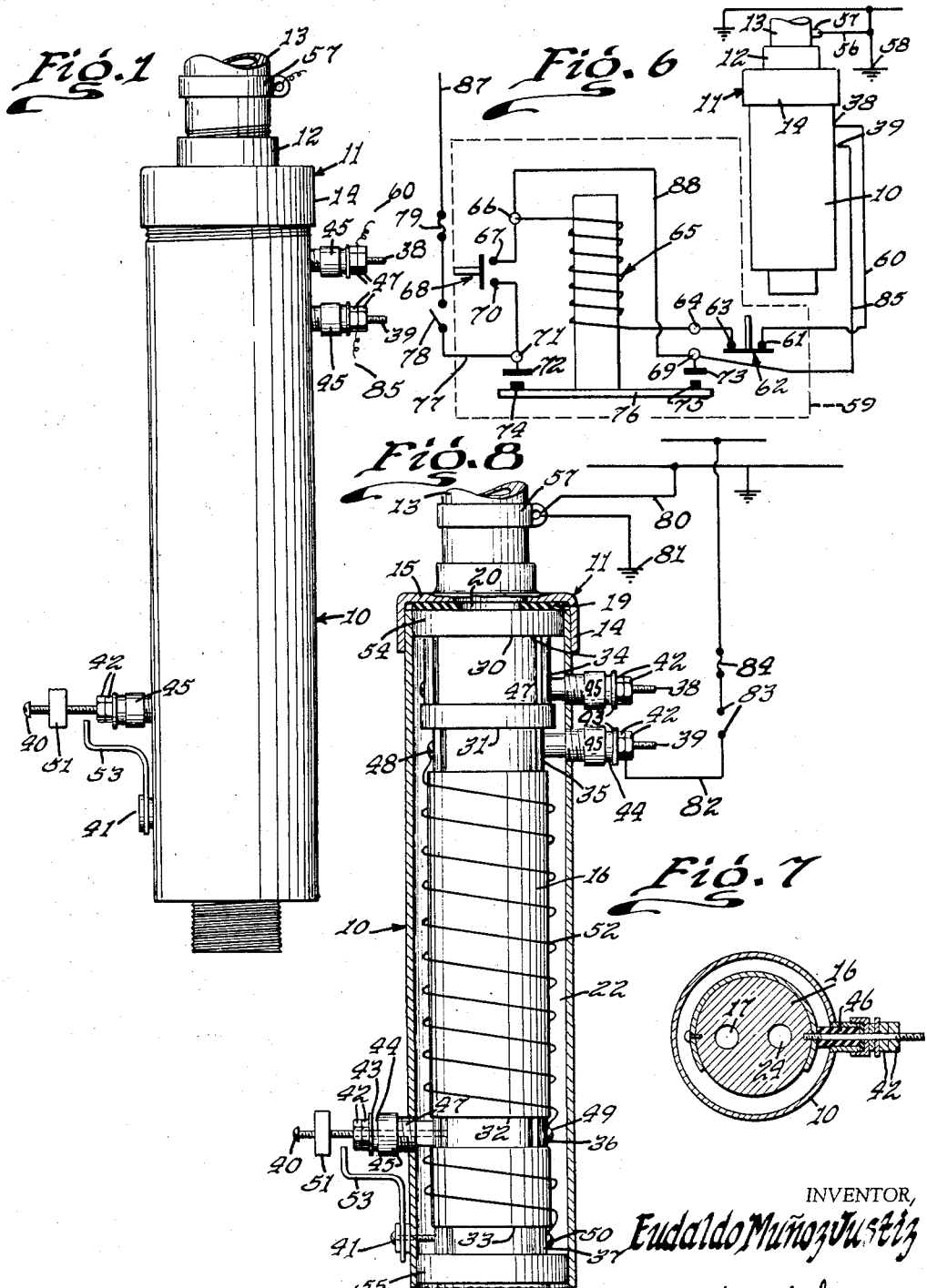
INVENTOR,
Eudaldo Muñoz Justiz
BY
ATTORNEY March 24, 1959  E. MUNOZ JUSTIZ  2,879,371
ELECTRIC HEATER
Filed April 16, 1957  2 Sheets-Sheet 2
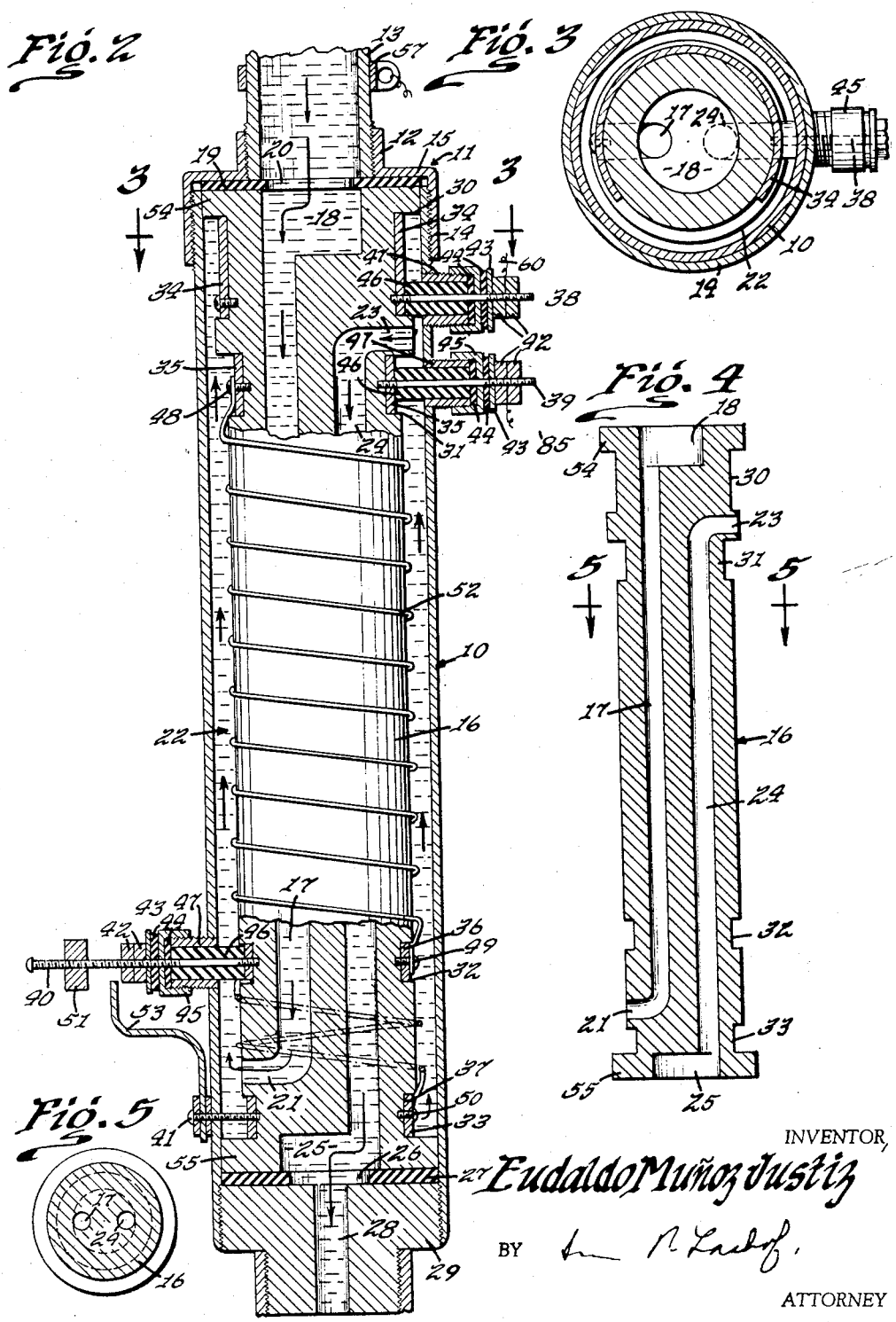
INVENTOR,
Eudaldo Muñoz Justiz
BY
ATTORNEY

United States Patent Office 2,879,371
Patented Mar. 24, 1959

2,879,371

ELECTRIC HEATER

Eudaldo Muñoz Justiz, Marianao, Cuba

Application April 16, 1957, Serial No. 653,200

7 Claims. (Cl. 219—39)

This invention relates to an electric heater, and more particularly to an electric heater for use in heating a fluid or liquid such as water.

The object of the invention is to provide an electrical heater which will efficiently heat water whereby a suitable quantity of hot water is available for any desired purpose.

Another object of the invention is to provide an electric water heater which includes a housing which has a core of insulated material arranged therein, and whereby water to be heated is adapted to circulate through the housing, the core having a resistor arranged thereon so that the water which is circulating through the housing will be electrically heated to a desired temperature.

A still further object of the invention is to provide an electric heater which is constructed so that the resistor will not burn out since the resistor remains submerged in water and wherein in one form of the invention, an electrical relay is adapted to be used, while in a different form of the invention the heater can be used without the relay.

A further object of the invention is to provide an electric heater which is extremely simple and inexpensive to manufacture.

Other objects and advantages will be apparent during the course of the following description.

In the accompanying drawings, forming a part of this application, and in which like numerals are used to designate like parts throughout the same:

Fig. 1 is an elevational view of the electric heater, constructed according to the present invention;

Fig. 2 is a longitudinal sectional view taken through the electric heater, with parts broken away and in section;

Fig. 3 is a sectional view taken on the line 3—3 of Fig. 2;

Fig. 4 is a longitudinal sectional view taken through the core;

Fig. 5 is a sectional view taken on the line 5—5 of Fig. 4;

Fig. 6 is a view illustrating schematically the wiring diagram wherein a relay is shown attached to the heater;

Fig. 7 is a transverse sectional view taken through the heater; and

Fig. 8 is an elevational view, with parts broken away and in section, showing a modification wherein the heater is used without the relay of Fig. 6.

Referring in detail to the drawings, the numeral 10 indicates a hollow housing of cylindrical shape, and connected to the upper end of the housing 10 is a bushing 11, Fig. 2. The bushing 11 includes a portion 12 which is arranged in threaded engagement with a pipe or conduit 13 which is adapted to be connected to a suitable source of fluid such as water which is to be heated. The bushing 11 further includes a portion 14 which threadedly engages the upper end of the housing 10.

The portions 12 and 14 of the bushing 11 are interconnected by a straight portion 15.

Positioned in the housing 10 is a core of insulated material, and the core is indicated generally by the numeral 16 and is shown in detail in Fig. 4. The core 16 is provided with a first passageway or channel 17 which has its upper end terminating in an enlarged recess or chamber 18. The recess 18 communicates with the conduit 13 as shown in Fig. 2, and a gasket 19 of yieldable material is arranged contiguous to an end of the core 16, the gasket 19 being provided with a central opening 20 for the passage therethrough of the water to be heated.

The lower end of the passageway 17 terminates in a transverse port 21 which communicates with a space or second passageway 22, and the passageway 22 is defined between the outer surface of the core 16 and the inner surface of the housing 10. The core 16 further includes a passageway 24 which communicates with the space or passageway 22 through the medium of a port 23, and the lower end of the passageway 24 terminates in an enlarged recess or chamber 25.

Water from the chamber or recess 25 passes through a central opening 26 in a gasket 27 and out through an opening 28 in a base 29. The base 29 is mounted in the lower end of the housing 10, and the water which passes through the opening 28 can lead to any suitable area or location where hot water is required or desired.

The exterior of the core 16 is provided with a first, second, third and fourth annular recess, and these recesses are indicated by the numerals 30, 31, 32 and 33. A first curved bracket 34 is positioned in the recess 30, a second bracket 35 engages the recess 31, a third bracket 36 engages the recess 32, and a fourth metal bracket 37 engages the recess 33.

A first securing element 38 extends outwardly from the bracket 34, a second securing element 39 extends outwardly from the bracket 35, a third securing element 40 extends outwardly from the bracket 36, and a fourth securing element 41 extends outwardly from the middle bracket 37, for a purpose to be later described.

The securing elements or bolts 38, 39 and 40 each have a pair of nuts 42 arranged in threaded engagement therewith, and the nuts 42 abut a washer 43. A cap 45 has a pair of gaskets 44 arranged on opposite sides thereof, and there is further provided an insulated body member 46 which extends through a tube 47.

The upper end of a resistor wire 52 is electrically connected to the bracket 35 through the medium of a securing element or bolt or screw 48, while a medium portion of the resistor 52 is connected to the bracket 36 through the medium of a securing element 49, and the lower end of the resistor 52 is electrically connected to the bracket 37 by means of a securing element 50.

A stop member 51 is adjustably mounted on the bolt or securing element 40, and a tongue 53 extends from the securing element 41 as shown in Fig. 2.

The core 16 further includes an upper portion 54 which snugly engages the upper inner surface of the housing 10, and the core 16 further includes a lower portion 55 which snugly engages the lower inner surface of the housing.

Referring to Fig. 6 of the drawings, there is shown schematically the wiring diagram when a relay is being used with the water heater, and in Fig. 6 the numeral 56 indicates a wire which is connected to the water inlet pipe 13 through the medium of a clamp 57, the wire 56 being grounded as at 58. The numeral 59 indicates in dotted lines in Fig. 6 a relay, and a conductor or wire 60 leads from the securing element 38 to contact 61 of a push button switch 62. The other contact 63 of the switch 62 is electrically connected to a terminal 64 of a coil 65.

The other terminal 66 of the coil 65 is connected to a contact 67 on a push button switch 68, and the terminal 66 is also electrically connected to a contact 69 of the relay. The contact 70 of the push button switch 68 leads to a terminal 71 which is connected to a contact piece 72, and a similar contact piece 73 is electrically connected to the terminal 69.

Contact elements 74 and 75 are mounted for movement into and out of electrical engagement with the contact pieces 72 and 73, and the contact elements 74 and 75 are mounted on an element 76. A wire or conductor 77 leads from the terminal 71, and the conductor 77 has a switch 78 and fuse 79 arranged therein.

Referring to Fig. 8 of the drawings, there is shown a modification wherein the relay is omitted, and in Fig. 8 the numeral 80 indicates a conductor which leads to the clamp 57 on the water inlet pipe 13, the clamp 57 being grounded as at 81. A conductor 82 leads from the securing element 39, and the conductor 82 has a switch 83 and fuse 84 arranged therein.

As shown in Fig. 6, a wire 85 leads from the securing element 39 to the terminal 69.

From the foregoing, it is apparent that there has been provided an electric heater which will quickly and efficiently heat a fluid such as water which circulates through the heater and wherein the heater includes a resistor wire which constitutes the electrical resistance of the heater and wherein the resistor wire is always submerged in water even when the inlet valve is closed, and even when water is not circulating through the heater. This has the effect of preventing the resistor from burning out since it always operates submerged in water.

Furthermore, the heater of the present invention is constructed so that if the resistor 52 is left connected to the electrical input circuit, and with the inlet water valve closed, that is, without water circulating through the heater, the water in which the resistor 52 is submerged will be heated and transformed into steam, and this steam will be expelled to the exterior through the opening 28 so as to give off a characteristic sound which in effect provides an alarm signal for notifying the user to open the switch so as to prevent the device from being damaged or burned out.

Furthermore, in order to provide a further protection for the resistor 52, a relay 59 is adapted to be used in combination with the heater and a conductor ring 34 is also provided wherein the conductor ring utilizes the conductiveness of the water itself, and wherein the relay includes a coil which is electrically connected so that when the level of water in the heater reaches the conductor ring, the circuit of the coil 65 of the relay 59 will be closed and grounded through the water when the push button 68 is depressed. Thus, under these conditions, the relay 59 will close the main circuit so as to leave the resistor 52 connected to the electric power line. If, with the inlet water valve closed and without disconnecting the heater, part of the water surrounding the resistor 52 is converted into steam and when the level of water drops below the previously mentioned ring 34, the circuit to the coil 65 is interrupted and the heater is disconnected.

Furthermore, with the heater of the present invention, the temperature of the water can be controlled not only by opening the inlet water valve to different degrees so that water can circulate through the heater at different rates, but also, there is provided a further control in that portions of the resistor 52 can be short-circuited which will increase the amount of heat generated so as to permit control of the temperature of the water.

The parts can be made of any suitable material and in different shapes and sizes, and the resistor 52 is adapted to be made of a suitable metal. The bushing 11 may be connected to the pipe 13 and to the housing 10 in any suitable manner such as by means of a threaded connection, or else this bushing may be connected by means of a pressure or friction fit. The core 16 is made of a suitable insulated material and the core 16 has the channels or passageways 17 and 24 therein.

The water enters the chamber 18 and then passes through the passageway 17 and then discharges through the port 21 into the space 22 and then the water enters the passageway 24 through the port 23 and then passes through the chamber 25 and out through the opening 28.

The water in the space 22 surrounds the resistor 52 and the core 16 is provided with the four throats or recesses 30, 31, 32 and 33 in which are seated the metal rings or brackets 34, 35, 36 and 37. The pins or securing elements 38, 39, 40 and 41 extend outwardly from the brackets 34, 35, 36 and 37, and the insulated body members 46 are mounted on certain of these securing elements.

Suitable gaskets such as the gaskets 44 are provided for insuring that there will be a fluid tight joint around the securing elements. The securing elements 38 and 39 are connected in place as previously described. The securing element 40 has a stop member 51 adjustably mounted thereon, and the stop member 51 is adapted to be used for causing the tongue 53 to make contact with the nuts 42 on the securing element 40 whereby that part of the resistor 52 between the brackets 36 and 37 can be short-circuited.

The small screw or bolt 41 makes electrical contact between the housing 10 and tongue 53. A suitable gasket and washer are arranged on the bolt 41 so as to provide a fluid tight joint.

The gaskets 19 and 27 serve to keep the resistor 52 always submerged in water even though the heater may not be operating, since the water in the heater can only pass out through the opening 23 which is at a higher level than the ring or bracket 35 which is where the upper terminal of the resistor 52 is connected.

Referring to Fig. 6 of the drawings, there is illustrated schematically the electrical connections between the heater, the relay 59, and the electric power line, when the heater is used in combination with the relay which opens the circuit when the level of water decreases below the ring 34 so as to provide greater protection for the resistor 52.

Referring to Fig. 8 of the drawings, there is illustrated schematically the electrical connections between the heater, and the electric lines when the relay is omitted and wherein the electric heater is connected directly to the electric input lines.

The following is given as two examples of the use of the device, namely, first when the relay is not being used and the connection is made directly to the electric supply line, and secondly, when the relay is used in combination.

In the first instance, when the relay is not being used, the heater is connected to the water pipe 13 and the pin or bolt 39 is connected to the conductor 82, there being a fuse 84 and a single pole switch 83 connected to the wire of the electric line. The ground wire of the electric line is connected to the water pipe 13 and the operation is as follows.

First, the inlet water valve is opened and the water enters the heater through the pipe 13 and then enters the chamber 18 and moves along the passageway or channel 17 and passes out through the port 21 and this water then passes upwardly through the space 22 between the housing 10 and core 16. Thus, the resistor 52 is covered with water and this water then enters the port 23 and passes through the channel 24 and then passes through the chamber 25 and out through the opening 28.

When the water comes out, the switch 83 is closed, and then the resistor 52 heats up and raises the temperature of the water which surrounds the resistor. After the heater has been used for the desired length of time, the switch 83 is opened, and then the water inlet valve is closed. In the event that the water inlet valve is closed without opening the switch 78, part of the water in the heater is transformed into steam and the steam is expelled out through the opening or perforation 28 which makes a noise to give an alarm indicating that the switch 83 must be opened.

In the second instance, when a relay is used in combination with the heater, the heater is connected to the water inlet pipe line 13, and the pin 38 is connected by means of the conductor 60 to the contact 61 of the push button 62 which is normally closed. The other contact 63 of the push button 62 is connected to a terminal 64 of the coil 65 and the other terminal 66 has an electric connection thereto. One of the last named connections leads to terminal 69 of the contact 73 while the other leads to contact 67 of another normally open push button 68, whose other contact 70 is connected to terminal 71 of contact 72 and whose terminal 71 is connected to the live wire of the electric line through the conductor 77, switch 78, and fuse 79.

The ground wire of the electric line is connected as in the previous case to the water pipe line 13.

The operation of the heater is as follows. First, the water inlet valve (not shown in the drawings) is opened and the water circulates within the heater as previously described, and with switch 78 closed, push button 68 is depressed manually which closes the circuit of the coil 65 and the electric current circulates as follows.

The current flows through the line 87, through the fuse 79, switch 78, conductor 77, terminal 71, contact 70, push button 68, contact 67, terminal 66, coil 65, terminal 64, contact 63, push button 62, contact 61, conductor 60, pin 38, ring 34, through the water, and through the metal housing 10 and ground connection 58.

Upon energizing the coil 65, the contacts 72 and 74, and 73 and 75 of the relay are closed and then when the push button 68 is released, the electric current circulates as follows.

The current circulates through the line 87, through the elements 79, 78, 77, 71, 72, 74, 76, 75, 73 and 69. At the terminal 69, the electrical current divides out, one part continues through the conductor 85, pin 39, ring 35, resistor 52, ring 37, screw 41, housing 10 and ground 58. The resistor 52 heats up and raises the temperature of the water surrounding it. The other portion of the electrical current which leaves the line 87 and reaches the terminal 69, continues through the conductor 88 to the terminal 66, coil 65, terminal 64, contact 63, push button 62, contact 61, conductor 60, pin 38, ring 34, through the water, the metallic housing 10 and the ground 58.

Thus, the coil 65 is energized so that the contacts of the relay are closed. Upon completion, initially the push button 62 is pushed to thereby open the circuit of the coil 65 and separate the contacts 72 and 74, and the contacts 73 and 75 of the relay. This opens the main circuit and disconnects the heater from the principal electric line and then the inlet water valve is closed. In the event that the user forgets to push the button 62 and the water valve is closed, part of the water is converted into steam which is expelled through the perforation 28, and when the level of water drops below the level of the ring 34, the circuit to the coil 65 is opened and the heater is automatically disconnected.

The temperature of the water may be regulated by opening the water inlet valve to different degrees which will cause different quantities of water to circulate in the heater. Furthermore, the temperature of the water may be raised slightly by turning the insulated nut 51 until it forces the tongue 53 to contact the nut 42 which short-circuits that part of the resistor 52 between the rings 36 and 37. Thus, upon reducing the resistance, the amount of heat will increase so that the temperature of the water will increase.

From the foregoing, it is apparent that there has been provided an electric heater which includes the cylindrical outer casing or housing 10 which has the bushing 11 on its upper end, and there is arranged within the housing, core 16 which is made of insulating material and the core 16 has the four seats or recesses 30, 31, 32 and 33 therein, there being a ring or bracket seated in each of these recesses. Pins or bolts extend outwardly from certain of these brackets through the housing and a bolt 41 is connected to the fourth bracket 37. The resistor wire 52 is wound around the core 16 and one end of the resistor wire is connected to the ring 35, while the other end of the resistor is connected to the ring 37, while an intermediate point of the resistor wire is connected to the ring 36.

There is further provided means for connecting the heater to a source of electrical energy and for short-circuiting that portion of the resistor wire between the rings 36 and 37, when desired.

The core 16 includes the passageways 17 and 24, as well as the recesses 18 and 25. The various bolts such as the bolts 38, 39 and 40 have the insulated body member 46 arranged in engagement therewith, and the caps 45 are arranged as shown in the drawings. Gaskets are provided adjacent the bolts and nuts are provided for maintaining the parts in their proper assembled position.

The tongue 53 is arranged as shown in Fig. 2, and arranged adjacent the ends of the core 16 are the rubber gaskets 19 and 27. As previously described, a normally open relay and two push buttons may be used, and one of the push buttons is normally open while the other is normally closed. The parts are electrically connected as previously described and the heater may be connected in any suitable location such as a water inlet pipe 13 or else the heater may be used in conjunction with a shower so that a sufficient quantity of hot water is available for any desired purpose.

I claim:

1. An electric heater comprising a housing, a bushing on the upper end of said housing, a base on the lower end of said housing provided with a neck, a core positioned within said housing and provided with a plurality of recesses, a bracket seated in each of said recesses, securing elements extending outwardly from certain of said brackets, a resistor wire surrounding said core and electrically connected to certain of said brackets, means for connecting the heater to a source of electrical energy, and means for selectively short-circuiting part of the resistor wire, said core being made of insulated material, said housing being made of electrically conductive material, there being longitudinally extending passageways in said core, said core being provided with enlarged chambers adjacent each end thereof communicating with said passageways, means for providing a fluid tight seal around said securing elements, said bushing being adapted to be connected to a source of supply of water to be heated, said base adapted to deliver hot water therethrough, a tongue extending outwardly from said housing, and a contact member on one of said securing elements for engagement by said tongue.

2. An electric heater comprising a housing, a bushing on the upper end of said housing, a base on the lower end of said housing provided with a neck, a core positioned within said housing and provided with a plurality of recesses, a bracket seated in each of said recesses, securing elements extending outwardly from certain of said brackets, a resistor wire surrounding said core and electrically connected to certain of said brackets, means for connecting the heater to a source of electrical energy, and means for selectively short-circuiting part of the resistor wire, said core being made of insulated material, said housing being made of electrically conductive material, there being longitudinally extending passageways in said core, said core being provided with enlarged chambers adjacent each end thereof communicating with said passageways, means for providing a fluid tight seal around said securing elements, said bushing being adapted to be connected to a source of supply of water to be heated, said base adapted to deliver hot water therethrough, a tongue extending outwardly from said housing, and a contact member on one of said securing elements for engagement by said tongue, a yieldable gasket arranged adjacent each end of said core, and a relay electrically connected to certin of said securing elements.

3. An electric heater comprising a housing, a bushing on the upper end of said housing, a base on the lower end of said housing provided with a neck, a core positioned within said housing and provided with a plurality of recesses, a bracket seated in each of said recesses, securing elements extending outwardly from certain of said brackets, a resistor wire surrounding said core and electrically connected to certain of said brackets, means for connecting the heater to a source of electrical energy, and means for selectively short-circuiting part of the resistor wire, said core being made of insulated material, said housing being made of electrically conductive material, there being longitudinally extending passageways in said core, said core being provided with enlarged chambers adjacent each end thereof communicating with said passageways, means for providing a fluid tight seal around said securing elements, said bushing being adapted to be connected to a source of supply of water to be heated, said base adapted to deliver hot water therethrough, a tongue extending outwardly from said housing, and a contact member on one of said securing elements for engagement by said tongue, a yieldable gasket arranged adjacent each end of said core, and a relay electriclly connected to certain of said securing elements, said relay including a coil and push buttons.

4. In a fluid heater, a housing, a bushing connected to the upper end of said housing, a conduit connected to said bushing and adapted to be connected to a source of supply of fluid, a core of insulating material positioned in said housing and including end portions engaging said housing, said core being provided with a first passageway for the passage therethrough of fluid, a space between the outer surface of said core and said housing defining a second passageway communicating with said first passageway, a third passageway having its upper end communicating with the second passageway, a base including a cylindrical portion arranged in said housing and said base being provided with a central opening communicating with the lower end of said third passageway, a resistor arranged around said core, there being first, second, third and fourth annular recesses in said core, a curved bracket arranged in engagement with each of said recesses, and said third and fourth brackets being connected to portions of said resistor, a first, second, third and fourth securing element extending outwardly from each of said brackets, insulated body members mounted on the securing elements extending from said first, second and third brackets, a tongue extending outwardly from said fourth securing element, and a stop member adjustably mounted on said third securing element for engagement by said tongue.

5. In a fluid heater, a housing, a bushing connected to the upper end of said housing, a conduit connected to said bushing and adapted to be connected to a source of supply of fluid, a core of insulating material positioned in said housing and including end portions engaging said housing, said core being provided with a first passageway for the passage therethrough of fluid, a space between the outer surface of said core and said housing defining a second passageway communicating with said first passageway, a third passageway having its upper end communicating with the second passageway, a base including a cylindrical portion arranged in said housing and said base being provided with a central opening communicating with the lower end of said third passageway, a resistor arranged around said core, there being first, second, third and fourth annular recesses in said core, a curved bracket arranged in engagement with each of said recesses, and said third and fourth brackets being connected to portions of said resistor, a first, second, third and fourth securing element extending outwardly from each of said brackets, insulated body members mounted on the securing elements extending from said first, second and third brackets, a tongue extending outwardly from said fourth securing element, and a stop member adjustably mounted on said third securing element for engagement by said tongue, a conductor extending from said second securing element and having a switch and fuse connected thereto, and a conductor extending from the conduit which carries the water to the bushing.

6. In a fluid heater, a housing, a bushing connected to the upper end of said housing, a conduit connected to said bushing and adapted to be connected to a source of supply of fluid, a core of insulating material positioned in said housing and including end portions engaging said housing, said core being provided with a first passageway for the passage therethrough of fluid, a space between the outer surface of said core and said housing defining a second passageway communicating with said first passageway, a third passageway, a base including a cylindrical portion arranged in said housing and said base being provided with a central opening communicating with the lower end of said third passageway, a resistor arranged around said core, there being first, second, third and fourth annular recesses in said core, a curved bracket arranged in engagement with each of said recesses, and said third and fourth brackets being connected to portions of said resistor, a first, second, third and fourth securing element extending outwardly from each of said brackets, insulated body members mounted on the securing elements extending from said first, second and third brackets, a tongue extending outwardly from said fourth securing element, and a stop member adjustably mounted on said third securing element for engagement by said tongue, and a relay connected to certain of said securing elements and including push buttons and a coil.

7. In a fluid heater, a housing, a bushing connected to said housing, a conduit connected to said bushing and adapted to be connected to a source of supply of fluid, a core positioned in said housing and including end portions engaging said housing, said core being provided with a first passageway for the passage therethrough of fluid, a space between the outer surface of said core and said housing defining a second passageway communicating with said first passageway, a third passageway having its upper end communicating with said second passageway, a base including a portion arranged in said housing and said base being provided with a central opening communicating with the lower end of said third passageway, a resistor arranged around said core, there being a plurality of recesses in said core, a bracket arranged in engagement with each recess, certain of said brackets being connected to portions of said resistor, securing elements extending outwardly from said brackets, body members mounted on the securing elements extending from brackets, a tongue extending outwardly from one of said securing elements, and a stop member adjustably mounted on one of said securing elements for engagement by said tongue.

References Cited in the file of this patent
UNITED STATES PATENTS

| | | |
|---|---|---|
| 1,277,621 | Macklind | Sept. 3, 1918 |
| 1,335,020 | Papini | Mar. 30, 1920 |
| 1,640,049 | Nesmith | Aug. 23, 1927 |
| 1,661,693 | Ewart | Mar. 6, 1928 |
| 2,136,764 | Smith | Nov. 15, 1938 |
| 2,303,623 | Dunmire | Dec. 1, 1942 |
| 2,474,637 | Pitts | June 28, 1949 |
| 2,588,314 | Wicks | Mar. 4, 1952 |